United States Patent
Mao

(10) Patent No.: US 6,388,429 B1
(45) Date of Patent: May 14, 2002

(54) CONTROLLER FOR POWER FACTOR CORRECTOR AND METHOD OF OPERATION THEREOF

(76) Inventor: Hengchun Mao, 3108 Buena Vista Dr., Plano, TX (US) 75025

(*) Notice: Subject to any disclaimer, the term of this patent is extended or adjusted under 35 U.S.C. 154(b) by 0 days.

(21) Appl. No.: 09/522,147

(22) Filed: Mar. 9, 2000

(51) Int. Cl.[7] .............................. G05F 1/10; H02M 3/24
(52) U.S. Cl. .......................................... 323/222; 363/89
(58) Field of Search ................................ 323/222, 344, 323/259, 260, 285; 363/21, 89, 95, 20

(56) References Cited

U.S. PATENT DOCUMENTS

| | | | |
|---|---|---|---|
| 4,677,366 A | | 6/1987 | Wilkinson et al. ........... 323/222 |
| 4,688,162 A | * | 8/1987 | Mutch et al. .................. 363/80 |
| 5,734,562 A | * | 3/1998 | Redl ............................. 363/16 |
| 5,867,379 A | * | 2/1999 | Maksimovic et al. ......... 363/89 |
| 5,912,549 A | * | 6/1999 | Farrington et al. ........... 363/16 |
| 6,034,513 A | * | 3/2000 | Farrington et al. .......... 323/222 |
| 6,049,473 A | * | 4/2000 | Jang et al. ..................... 363/89 |

OTHER PUBLICATIONS

U.S Patent Application No. 09/324,074 entitled "Frequency Modulation Controller for Single-switch, polyphase, DCM Boost Converter and Method of Operation Thereof" filed on Jun. 1, 1999.

* cited by examiner

*Primary Examiner*—Rajnikant B. Patel

(57) ABSTRACT

A controller for a power factor corrector (PFC), having a controllable switch and operable in a discontinuous conduction mode (DCM), and a method of controlling the controllable switch. In one embodiment, the controller includes: (1) a drive circuit adapted to drive the controllable switch and (2) a current mode control circuit adapted to sense a current of the PFC and develop a current control signal based thereon. The drive circuit reduces a duty cycle of the controllable switch based on the current control signal to reduce input current distortion in the PFC.

25 Claims, 2 Drawing Sheets

CONTROLLER FOR POWER FACTOR CORRECTOR AND METHOD OF OPERATION THEREOF

TECHNICAL FIELD OF THE INVENTION

The present invention is directed, in general, to power conversion and, more specifically, to a controller for a power factor corrector and a method of operating the controller.

BACKGROUND OF THE INVENTION

Power factor correction is a common requirement of many electronic systems today. To achieve a high power factor, switched-mode converters, such as boost converters, are often employed. Boost converters may be used to elevate an output voltage to a desired value greater than an input voltage. Boost converters can be operated in several different modes. In low to medium power applications, a discontinuous conduction mode (DCM) of operation is attractive because DCM operation uses a simple control circuit and does not need a complex snubber circuit. For higher power, power factor correction applications, a continuous conduction mode (CCM) of operation for the boost converter is normally used. However, CCM operation typically requires a more complex control circuit and a complex snubber circuit to operate satisfactorily.

Control of a conventional DCM boost converter employs essentially a constant duty cycle for the power switch of the boost converter. That is, the duty cycle of the power switch does not change significantly over a cycle of the AC input power. At "high line" where the input voltage is at its highest RMS value, the slow discharge of the current through the boost inductor around the peak of the AC input voltage produces an excessive peak amount of input current. This excessive peak amount of input current can generate a high amount of total harmonic distortion (THD) for the input current.

For example, a boost converter operating in DCM with an input voltage of 265 volts and an output voltage of 400 volts may have an input current THD of around 50 percent. This amount of THD is generally not acceptable. To reduce the THD of the input current, some boost converters are operated in a critical conduction mode. That is, the power switch of the boost converter is closed a fixed time when the boost inductor current reaches zero each control period. However, such operation will cause the power switch to experience an unusually wide range of switching frequencies, requiring a high level of input filtering to meet electromagnetic interference (EMI) standards. A boost converter operating in DCM may also move into CCM operation under certain situations. In CCM operation, special care should be taken to account for excessive currents that may damage components of the converter that were designed to operate primarily in DCM.

Accordingly, what is needed in the art is an improved way to control PFC converters operable primarily in DCM that enhances the performance thereof without the complexity and cost penalties associated with conventional CCM converters.

SUMMARY OF THE INVENTION

To address the above-discussed deficiencies of the prior art, the present invention provides a controller for a power factor corrector (PFC), operable in a discontinuous conduction mode (DCM) and having a controllable switch, and a method of controlling the controllable switch. In one embodiment, the controller includes: (1) a drive circuit adapted to drive the controllable switch and (2) a current mode control circuit adapted to sense a current of the PFC and develop a current control signal based thereon. The drive circuit reduces a duty cycle of the controllable switch based on the current control signal to reduce input current distortion in the PFC.

The present invention introduces, in one aspect, a controller that modifies a duty cycle of the controllable switch (power switch) of the PFC based on an input current thereof. By judiciously reducing the duty cycle of the controllable switch, preferably around a peak of the input voltage, the peak input current to the PFC can be reduced, thereby affording a significant reduction in the total harmonic distortion (THD) of the input current. This judicious limiting of the peak value of the input current also makes the PFC more robust if its operation should change from a discontinuous conduction mode (DCM) to a continuous conduction mode (CCM) wherein damage to components may be more probable.

In one embodiment of the present invention, the controller further includes a frequency modulation control circuit adapted to sense a rectified output voltage of the PFC and develop a voltage control signal based on the rectified output voltage. The drive circuit modifies a switching frequency of the controllable switch based on the voltage control signal. In a related embodiment, the frequency modulation circuit includes a voltage divider for sensing the rectified output voltage. Of course, other sensing schemes may be employed to sense the rectified output voltage. The principle of frequency modulation of the controllable switch is described in detail in U.S. patent application Ser. No. 09/324,074, entitled "Frequency Modulation Controller For Single-switch, Polyphase, DCM Boost Converter and Method of Operation Thereof" to Hengchun Mao, filed Jun. 1, 1999. The above-listed application is herein incorporated by reference as if reproduced herein in its entirety.

In one embodiment of the present invention, the current mode control circuit includes a current sensor adapted to sense the current of the PFC and a filter adapted to develop the current control signal based on the current of the PFC. The current sensor may be used to sense current from any pertinent point in the PFC. The filter then smooths the current control signal to an appropriate degree to obtain a high frequency averaged current signal commensurate with the requirements of the drive circuit.

In one embodiment of the present invention, the drive circuit includes: (1) a voltage compensation circuit adapted to receive a signal representing an output voltage of the PFC and develop an intermediate signal therefrom and (2) a modulator, coupled to the voltage compensation circuit, adapted to develop a drive signal for the controllable switch based on the intermediate signal. Of course, other ways of developing the drive signal are well within the broad scope of the present invention.

In a related embodiment of the present invention, the voltage compensation circuit includes an error amplifier adapted to compare the signal representing the output voltage to a reference signal and develop the intermediate signal therefrom. The error amplifier accurately determines any deviation between the output voltage and the reference voltage to provide an appropriate intermediate signal for output voltage correction purposes.

In another related embodiment, the modulator includes a duty cycle comparator adapted to receive a ramp signal and the intermediate signal and develop the drive signal therefrom. The comparator accurately compares the input values of the ramp signal and the intermediate signal to determine the duty cycle for the controllable switch.

In one embodiment of the present invention, the PFC employs a topology selected from the group consisting of a boost converter, a buck converter, a forward converter, a flyback converter, and a SEPIC converter. Of course, other topologies are well within the broad scope of the present invention.

In one embodiment of the present invention, the PFC is further operable in a continuous conduction mode (CCM). The PFC may enter CCM, for example, during a peak of the input line voltage.

In another embodiment of the present invention, the PFC includes an input EMI filter. Depending on the topology used, the input filter may include a filter inductor, a filter capacitor or both the filter inductor and the filter capacitor. Of course, the use of any input filter topology is well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
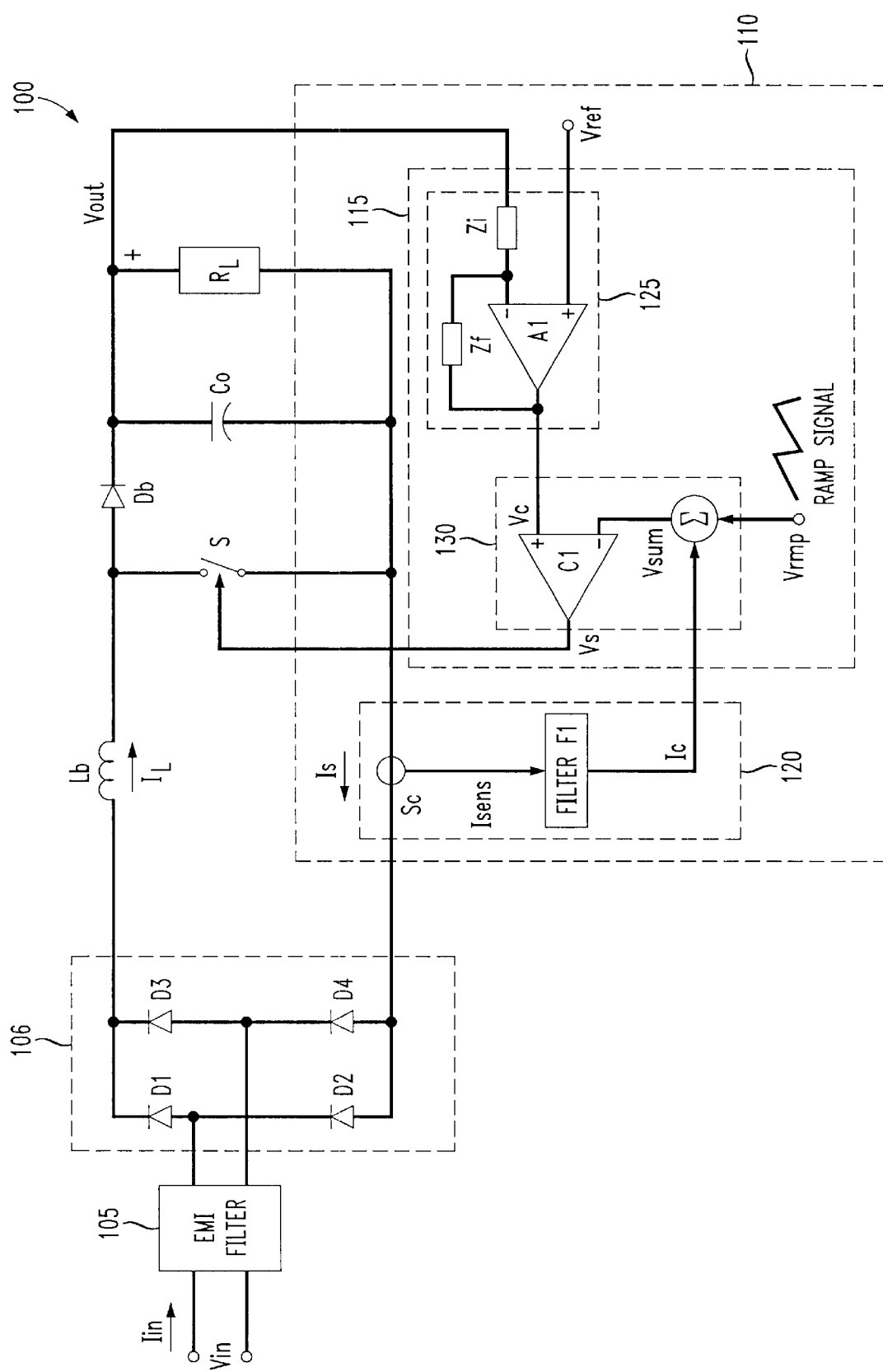
FIG. 1 illustrates a schematic diagram of an embodiment of a power factor corrector (PFC) constructed according to the principles of the present invention.

Referring initially to FIG. 1, illustrated is a schematic diagram of an embodiment of a power factor corrector (PFC) 100 constructed according to the principles of the present invention. The PFC 100 has an input couplable to an AC source (not shown) having an input voltage Vin and supplying an input current Iin. The PFC 100 provides an output voltage Vout at an output thereof. The PFC 100 includes an electromagnetic interference (EMI) filter 105 and a rectifier 106 having first, second, third and fourth diodes D1, D2, D3, D4. The PFC 100 further includes a converter, such as a boost converter having a boost inductor Lb (with a boost inductor current $I_L$), a controllable switch S, a boost diode Db and an output filter capacitor Co. In the illustrated embodiment, the PFC 100 employs a boost converter topology wherein the output voltage Vout is greater than a rectified input voltage Vin. Of course, other topologies, including a buck converter, a forward converter, a flyback converter, and a SEPIC converter topology, are well within the broad scope of the present invention. The PFC 100 still further includes a controller 110. The PFC 100 supplies the output voltage Vout to an output load $R_L$.

The controller 110 includes a drive circuit 115 and a current mode control circuit 120. The drive circuit 115 includes a voltage compensation circuit 125 and a modulator 130. The voltage compensation circuit 125 includes an error amplifier A1 having a feedback impedance Zf and an input impedance Zi. The error amplifier A1 receives the output voltage Vout and a voltage reference signal Vref and provides an intermediate signal (compensation output voltage signal) Vc based on the output voltage Vout and the voltage reference signal Vref. The modulator 130 includes a duty cycle comparator C1 and a summing junction Σ. The duty cycle comparator C1 receives the intermediate signal Vc and a summing junction output signal Vsum and provides a switch control output signal Vs. The summing junction Σ receives a ramp signal Vrmp and a current control signal Ic from the current mode control circuit 120 and provides the summing junction output signal Vsum. The current mode control circuit 120 includes a current sensor Sc and a filter F1. The current sensor Sc senses a sense current Is from the PFC 100 and provides a sensed current signal Isens to the filter F1 for smoothing. The filter F1 then provides the current control signal Ic to the summing junction Σ.

The EMI filter 105 reduces electromagnetic interference generated by a ripple current component of an input current Iin to meet appropriate EMI standards. The rectifier 106, arranged in a full-bridge topology, provides DC voltage to the boost inductor Lb. When the controllable switch S is closed, the boost inductor current $I_L$ increases steadily, and the boost diode Db isolates the output voltage Vout from the closed controllable switch S and the boost inductor Lb. Under this condition, the output capacitor Co provides current to the output load $R_L$. Opening the controllable switch S allows the boost inductor current $I_L$ to flow through the boost diode Db to the output load $R_L$ and the output capacitor Co. A boost in the output voltage Vout over the input voltage Vin is obtained when the controllable switch S is open. Normally, the PFC 100 operates in DCM wherein the boost inductor current $I_L$ is not continuous. However, even if the PFC 100 enters continuous conduction mode (CCM) around the peak of the input line voltage, the current mode control circuit 120 can automatically limit the current such that the PFC 100 can operate reliably.

The drive circuit 115 and the current mode control circuit 120 work in concert to establish the duty cycle of the controllable switch S. The duty cycle of the controllable switch S may be defined as the normalized ratio of the portion of time that it is closed (e.g., a first portion D of the duty cycle) to a total time period representing the summation of the times that it is both open and closed (e.g., D+(1-D); wherein (1-D) represents a complementary portion of the duty cycle). The voltage compensation circuit 125 develops the intermediate signal Vc that is a function of both the output voltage Vout and the reference signal Vref. The voltage gain of the error amplifier A1 is basically the ratio of the feedback impedance Zf to the input impedance Zi (i.e., Zf/Zi) In this embodiment, the reference signal Vref is an external DC voltage that establishes a nominal value of the output voltage Vout.

The duty cycle comparator C1 of the modulator 130 compares the intermediate signal Vc to the summing junction output signal Vsum. The summing junction output signal Vsum is formed by a summation of the ramp signal Vrmp and the current control signal Ic. The ramp signal Vrmp is externally provided to the controller 110 in this embodiment. The controllable switch S is closed (for a first portion D of the duty cycle) when the summation of the ramp signal Vrmp and the current control signal Ic is less than the intermediate signal Vc. Alternately, the controllable switch S is open (for a complementary portion (1-D) of the duty cycle) when the summation of the ramp signal Vrmp and the current control signal Ic is greater than the intermediate signal Vc.

The frequency of the ramp signal Vrmp is typically 50 to 100 kilohertz and determines the overall nominal operating frequency of the controllable switch S. The frequency response of the current control signal Ic is much lower than the ramp signal Vrmp, since it may, in the illustrated embodiment, follow a rectified waveform of the input current Iin. The frequency response of the voltage compensation circuit 125 may also be much lower than the ramp signal vrmp, since the output filter capacitor Co attempts to maintain the output voltage Vout at its present value.

A small negative change in the output voltage Vout would produce a larger positive change in the intermediate signal Vc, which is coupled to an input of the modulator 130. This positive change in the intermediate signal Vc requires that the summing junction output signal Vsum increase before the modulator 130 changes its output state. This increase causes the controllable switch to remain closed longer thereby increasing its duty cycle (i.e., a larger value of the first portion D of the duty cycle). An increased duty cycle increases the output voltage Vout until both the output voltage Vout and the duty cycle are again restored to their nominal values.

A primary contribution to the total harmonic distortion (THD) of the input current Iin would occur around the peak AC values of the input voltage Vin, where an uncorrected waveform of the input current Iin would tend to reach an excessively high peak. The current mode control circuit 120 reduces this excessive peaking of the input current Iin as would otherwise occur in a conventional PFC. In this embodiment, the sense current Is is substantially equal in magnitude to the boost inductor current IL. However, in other embodiments of the present invention, the sense current Is may be taken from currents flowing through the boost diode Db or the controllable switch S.

The sense current Is modifies the summing junction output signal Vsum to reduce the duty cycle of the controllable switch S during a peak of the input current Iin. This action limits the peak value of the input current Iin, thereby reducing the THD. In the illustrated embodiment, the THD may be reduced to about 5 percent, as compared to a THD of about 50 percent for a conventional PFC. Of course, other embodiments may reduce the THD by a greater or lesser amount. In either case, the operation of the PFC 100 may become more robust. Even if the PFC 100 moves into CCM operation, such as during a peak of the input line voltage, the peak value of the input current Iin would still be limited, thereby providing some protection against components being over-stressed.

Figure 2:
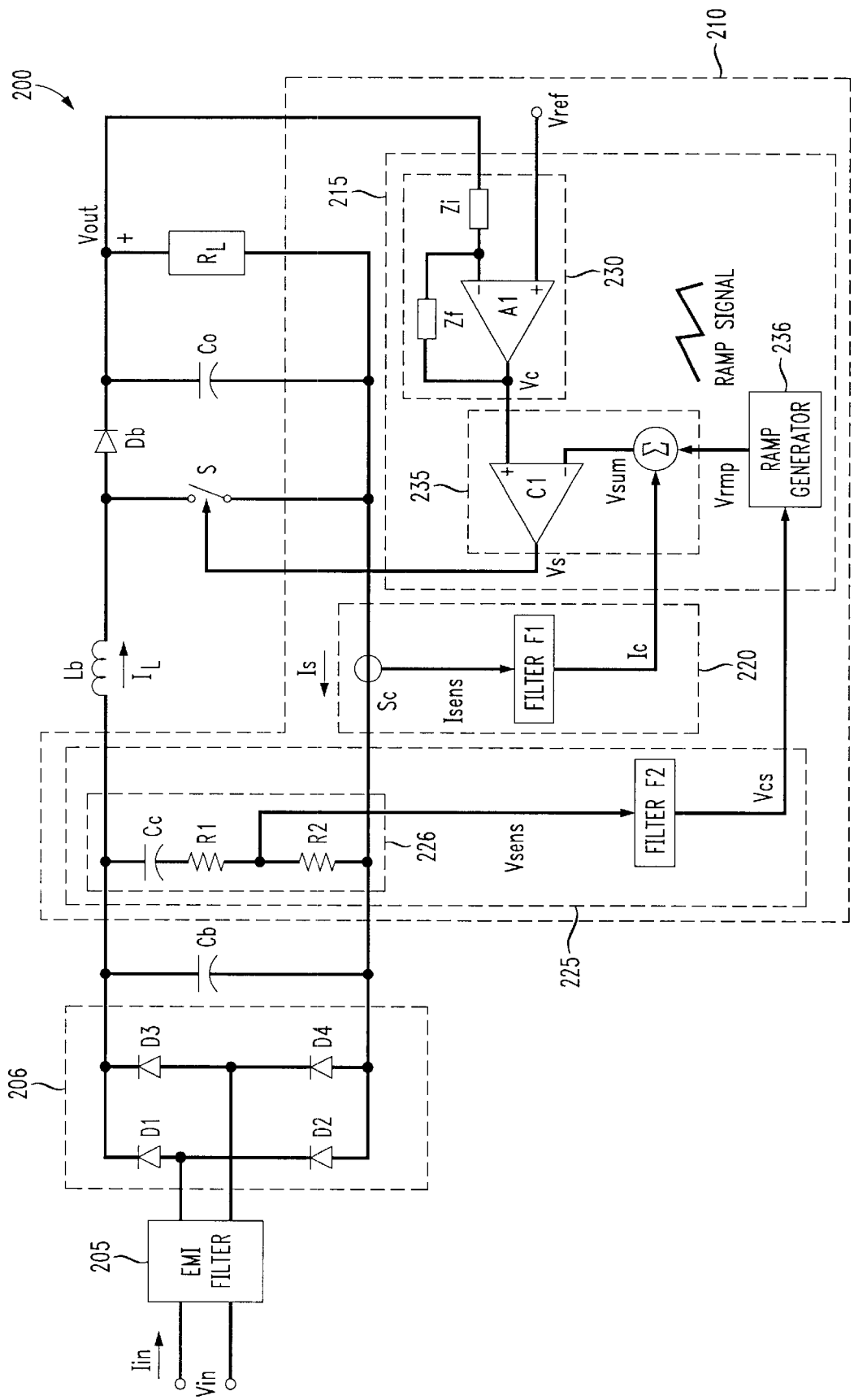
FIG. 2 illustrates a schematic diagram of another embodiment of a PFC constructed according to the principles of the present invention.

Turning now to FIG. 2, illustrated is a schematic diagram of another embodiment of a PFC 200 constructed according to the principles of the present invention. The PFC 200 is couplable to an AC source (not shown) having an input voltage Vin and supplying an input current Iin. The PFC 200 provides an output voltage Vout at an output thereof. The PFC 200 includes an electromagnetic interference (EMI) filter 205 and a rectifier 206 having first, second, third and fourth diodes D1, D2, D3, D4. The PFC 200 further includes a converter, such as a boost converter, having a boost inductor Lb (with a boost inductor current $I_L$), a controllable switch S, a boost diode Db and an output filter capacitor Co. The PFC 200 still further includes a controller 210. The PFC 200 supplies the output voltage Vout to an output load $R_L$.

The controller 210 includes a drive circuit 215, a current mode control circuit 220 and a frequency modulation control circuit 225. The drive circuit 215 includes a voltage compensation circuit 230, a modulator 235 and a ramp generator 236. The voltage compensation circuit 230 includes an error amplifier A1 having a feedback impedance Zf and an input impedance Zi. The error amplifier A1 receives the output voltage Vout and a voltage reference signal Vref and provides an intermediate signal (compensation output voltage signal) Vc based on the output voltage Vout and the voltage reference signal Vref. The modulator 235 includes a duty cycle comparator C1 and a summing junction Σ. The duty cycle comparator C1 receives the intermediate signal Vc and a summing junction output signal Vsum and provides a switch control output signal Vs. The summing junction Σ receives a ramp signal Vrmp and a current control signal Ic from the current mode control circuit 220 and provides the summing junction output signal Vsum. The ramp generator 236 receives a voltage control signal Vcs from the frequency modulation control circuit 225 and determines a frequency of the ramp signal Vrmp based thereon.

The current mode control circuit 220 includes a current sensor Sc and a filter F1. The current sensor Sc senses a sense current Is from the PFC 200 and provides a sensed current signal Isens to the filter F1 for smoothing. The filter F1 then provides the current control signal Ic to the summing junction Σ. The frequency modulation control circuit 225 includes a rectified voltage monitoring circuit 226 having a coupling capacitor Cc and first and second resistors R1, R2. The frequency modulation control circuit 225 further includes a filter F2. The rectified voltage monitoring circuit 226 provides a sense voltage Vsens, which carries an AC portion of the rectified voltage, to the filter F2 for smoothing. The filter F2 provides the voltage control signal Vc to the ramp generator 236 to adjust the frequency of the ramp signal Vrmp. In the illustrated embodiment, the range of frequency adjustments may be about 10–20% of the frequency. Of course, other embodiments may be designed to have a greater or lesser frequency adjustment range.

The general operation of the PFC 200 employing the drive circuit 215 and the current mode control circuit 220 is analogous to the operation of the PFC 100 illustrated and described with respect to FIG. 1 above. Inclusion of the frequency modulation control circuit 225 incorporates an additional refinement over the PFC 100 of FIG. 1. The PFC 100 may require an EMI filter 105 that is larger than desired due to high switching frequency current ripple in the input current Iin. Additionally, in some cases, the PFC 100 may also suffer from a sub-harmonic oscillation due to the use of current mode control alone. The operation of the PFC 200 may be improved with respect to the operation of the PFC 100 by the addition of the frequency modulation control circuit 225, which utilizes a rectified waveform of the input voltage Vin to further modify the nominal operating frequency of the controllable switch S to spread out the harmonic spectrum of the input current and to avoid sub-harmonic oscillations. In the illustrated embodiment, the attenuation of the input filter may be reduced by about 10 dB. Of course, other ranges of reductions are possible and are well within the broad scope of the present invention.

The rectified voltage monitoring circuit 226 is basically a voltage divider that senses an AC ripple component of the rectified input voltage to provide the sense voltage Vsens. The voltage control signal Vcs is smoothed by the filter F2 to provide the sense voltage Vsens, which is then used to modify the nominal operating frequency of the ramp generator 236. The nominal operating frequency of the ramp generator 236 is modulated when the AC ripple component of the rectified input voltage is around both its peak and zero-crossing values. Of course, the operating frequency of the ramp generator 236 may be continuously modulated as required. Around the peak of the AC ripple, the operating frequency of the ramp generator 236 is increased, which decreases the average value of the input current Iin. Around the zero-crossing of the AC ripple, the operating frequency of the ramp generator 236 is decreased, which increases the average value of the input current Iin.

In this manner, the frequency modulation of the ramp generator 236 spreads the high-frequency spectrum of the input current Iin, further reducing its THD over the use of the current mode control circuit 220 alone. In the illustrated embodiment, a reduction in a dominant harmonic component of the input current Iin of typically 10 dB may be accomplished in the PFC 200 as compared to the PFC 100, thereby appropriately reducing the size and cost of the EMI filter 205. Of course, other embodiments may reduce the THD by a greater or lesser amount. The operation of the frequency modulation and the current feedback may be coordinated and adjusted to optimize the performance of the PFC 200 over a wide range of the input voltage Vin and the output load $R_L$.

Portions of the controller 210 may be embodied in an integrated control circuit, such as the UC3842 manufactured by Unitrode Corporation of Merrimack, N.H. The UC3842 is an example of a low cost integrated circuit that may be employed to advantage in some embodiments of the present invention. Of course, other controllers may be employed and still be well within the broad scope of the present invention.

In summary, the present invention introduces a controller for use with a PFC that modifies a duty cycle of a drive signal employed by the PFC. The duty cycle is modified based on sensing a current of the PFC. This judicious modification of the duty cycle reduces the peak value of the input current to the PFC and thereby affords a significant reduction in the THD of the input current. This judicious limiting of the peak value of the input current also makes the PFC more robust if its operation should change from DCM to CCM, wherein damage to components may be more probable. The embodiments of the present invention discussed above produce an input current quality that is similar to CCM operation in a converter operating in DCM.

Although the present invention has been described in detail, those skilled in the art should understand that they can make various changes, substitutions and alterations herein without departing from the spirit and scope of the invention in its broadest form.

What is claimed is:

1. For use with a power factor corrector (PFC) operable in a discontinuous conduction mode (DCM) and having a controllable switch, a controller, comprising:
    a current mode control circuit adapted to sense a current of said PFC and develop a current control signal based thereon; and
    a drive circuit adapted to drive said controllable switch, including:
        a voltage compensation circuit adapted to receive a signal representing an output voltage of said PFC and develop an intermediate signal therefrom, and
        a modulator, coupled to said voltage compensation circuit, adapted to develop a drive signal for said controllable switch based on said intermediate signal and a sum of said current control signal and a ramp signal, said drive circuit thereby capable of reducing a duty cycle of said controllable switch based thereon to reduce input current distortion in said PFC.

2. The controller as recited in claim 1 further comprising a frequency modulation control circuit adapted to sense a rectified voltage of said PFC and develop a voltage control signal based thereon, said drive circuit thereby capable of modifying a switching frequency of said controllable switch based on said voltage control signal.

3. The controller as recited in claim 2 wherein said frequency modulation circuit comprises a voltage divider adapted to sense said rectified voltage.

4. The controller as recited in claim 1 wherein said current mode control circuit comprises a current sensor adapted to sense said current and a filter adapted to develop said current control signal based thereon.

5. The controller as recited in claim 1 wherein said voltage compensation circuit comprises an error amplifier adapted to compare said signal representing said output voltage to a reference signal and develop said intermediate signal therefrom.

6. The controller as recited in claim 1 wherein said modulator comprises a duty cycle comparator adapted to receive said intermediate signal and a signal representing said sum of said current control signal and said ramp signal and develop said drive signal therefrom.

7. The controller as recited in claim 1 wherein said PFC employs a topology selected from the group consisting of:
    a boost converter;
    a buck converter;
    a forward converter;
    a flyback converter; and
    a SEPIC converter.

8. The controller as recited in claim 1 wherein said PFC is further operable in a continuous conduction mode (CCM).

9. The controller as recited in claim 1 wherein said PFC comprises an input filter.

10. A method of controlling a controllable switch of a power factor corrector (PFC) operable in a discontinuous conduction mode (DCM), comprising:
    sensing a current of said PFC and developing a current control signal based thereon;
    developing an intermediate signal from a signal representing an output voltage of said PFC;
    developing a signal representing a sum of said current control signal and a ramp signal; and
    developing a drive signal for said controllable switch based on said intermediate signal and said signal representing said sum of said current control signal and said ramp signal, said drive signal reducing a duty cycle of said controllable switch based thereon to reduce input current distortion in said PFC.

11. The method as recited in claim 10, further comprising:
    sensing a rectified voltage of said PFC;
    developing a voltage control signal based thereon; and
    modifying a switching frequency of said controllable switch based on said voltage control signal.

12. The method as recited in claim 11 wherein said sensing said rectified voltage is performed by a voltage divider.

13. The method as recited in claim 10 wherein said sensing a current of said PFC is performed by a current mode control circuit including a current sensor to sense said current and a filter to develop said current control signal based thereon.

14. The method as recited in claim 10 wherein said developing said intermediate signal further comprises comparing said signal representing said output voltage to a reference signal.

15. The method as recited in claim 10 wherein said developing said drive signal is performed by a duty cycle comparator that receives said intermediate signal and said signal representing said sum of said current control signal and said ramp signal to develop said drive signal.

16. The method as recited in claim 10 wherein said PFC employs a topology selected from the group consisting of:
   a boost converter;
   a buck converter;
   a forward converter;
   a flyback converter; and
   a SEPIC converter.

17. The method as recited in claim 10 wherein said PFC is further operable in a continuous conduction mode (CCM).

18. The method as recited in claim 10 wherein said PFC comprises an input filter.

19. A power factor corrector (PFC) operable in a discontinuous conduction mode (DCM), comprising:
   an electromagnetic interference (EMI) filter;
   a rectifier coupled to said EMI filter;
   a converter coupled to said rectifier and having a controllable switch; and
   a controller, including:
      a current mode control circuit that senses a current of said PFC and develops a current control signal based thereon, and
      a drive circuit that drives said controllable switch, including:
         a voltage compensation circuit that receives a signal representing an output voltage of said PFC and develops an intermediate signal therefrom, and
         a modulator, coupled to said voltage compensation circuit, that develops a drive signal for said controllable switch based on said intermediate signal and a sum of said current control signal and a ramp signal, said drive circuit thereby capable of reducing a duty cycle of said controllable switch based thereon to reduce input current distortion in said PFC.

20. The PFC as recited in claim 19 wherein said controller further comprises a frequency modulation control circuit that senses a rectified voltage of said PFC and develops a voltage control signal based thereon, said drive circuit thereby capable of modifying a switching frequency of said controllable switch based on said voltage control signal.

21. The PFC as recited in claim 20 wherein said frequency modulation circuit comprises a voltage divider that senses said rectified voltage.

22. The PFC as recited in claim 19 wherein said current mode control circuit comprises a current sensor that senses said current and a filter that develops said current control signal based thereon.

23. The PFC as recited in claim 19 wherein said voltage compensation circuit comprises an error amplifier that compares said signal representing said output voltage to a reference signal and develops said intermediate signal therefrom.

24. The PFC as recited in claim 19 wherein said modulator comprises a duty cycle comparator that receives said intermediate signal and a signal representing said sum of said current control signal and said ramp signal and develops said drive signal therefrom.

25. The PFC as recited in claim 19 wherein said PFC is further operable in a continuous conduction mode (CCM).

* * * * *